(12) United States Patent
Hance et al.

(10) Patent No.: US 7,670,139 B2
(45) Date of Patent: Mar. 2, 2010

(54) METHOD AND APPARATUS FOR REDUCED EMISSIONS FUEL COMBUSTION

(75) Inventors: Robert L. Hance, Austin, TX (US); John E. Kane, Houston, TX (US); Stephanie G. Dye, Houston, TX (US)

(73) Assignee: Wells Products Group, Inc., Houston, TX (US)

( * ) Notice: Subject to any disclaimer, the term of this patent is extended or adjusted under 35 U.S.C. 154(b) by 773 days.

(21) Appl. No.: 11/408,539

(22) Filed: Apr. 19, 2006

(65) Prior Publication Data
US 2007/0287110 A1 Dec. 13, 2007

(51) Int. Cl.
*C01B 31/20* (2006.01)
(52) U.S. Cl. .......... 432/266; 423/437.1; 75/392
(58) Field of Classification Search .......... 432/266; 431/12; 75/623, 366, 392, 450, 444, 396, 75/743; 423/648.1, 179, 438, 659, 608, 641, 423/592.1, 645, 437.1, 652, 650; 266/168, 266/170
See application file for complete search history.

(56) References Cited

U.S. PATENT DOCUMENTS

| | | | |
|---|---|---|---|
| 3,311,466 A * | 3/1967 | Curlook .................. 75/444 |
| 4,368,169 A | 1/1983 | Kummler et al. |
| 4,380,469 A * | 4/1983 | Sulzbacher .................. 75/707 |
| 4,473,658 A * | 9/1984 | Schwartz .................. 502/45 |
| 5,013,336 A * | 5/1991 | Kempf et al. .................. 95/275 |
| 5,125,965 A * | 6/1992 | Sebenik .................. 75/392 |
| 5,246,018 A * | 9/1993 | Deevi et al. .................. 131/359 |
| 6,270,631 B1 * | 8/2001 | Anthony .................. 204/157.42 |
| 6,372,156 B1 | 4/2002 | Kong et al. |
| 7,118,606 B2 * | 10/2006 | Labinov et al. .......... 48/127.9 |
| 2005/0044991 A1 * | 3/2005 | Guo et al. .................. 75/721 |
| 2007/0007121 A1 * | 1/2007 | Guo et al. .................. 204/157.47 |
| 2007/0045125 A1 * | 3/2007 | Hartvigsen et al. .......... 205/637 |
| 2007/0224109 A1 * | 9/2007 | Chaifetz et al. .......... 423/491 |
| 2007/0287110 A1 * | 12/2007 | Hance et al. .................. 431/12 |
| 2008/0032382 A1 * | 2/2008 | Schnoor et al. .......... 435/252.3 |

* cited by examiner

*Primary Examiner*—Gregory A Wilson
(74) *Attorney, Agent, or Firm*—Browning Bushman P.C.

(57) ABSTRACT

A system for combusting carbon-containing fuel includes a reactor 10 for simultaneously supporting oxidation of the fuel and conversion of $CO_2$ within the reactor. A metal oxide or metal is input to the reactor to convert the $CO_2$ to a mineralized $CO_2$ product. A cold trap 44 is provided for capturing exhaust gases from the reactor and returning condensate to the reactor, and a gas pump 50 maintains a desired vacuum or pressure within the reactor and the cold trap. Combustion products may be recycled to increase their energy value.

29 Claims, 1 Drawing Sheet

METHOD AND APPARATUS FOR REDUCED EMISSIONS FUEL COMBUSTION

FIELD OF THE INVENTION

The present invention relates to techniques for reducing gaseous emissions and increasing net energy production from the combustion of a carbon-containing fuel. More particularly, the invention relates to an efficient system for converting fuel to usable energy, and in a preferred system includes the recycling a product of that conversion to increase its energy content for re-use in subsequent combustion, and substantially reducing the emissions of pollutants that are normally produced in combustion systems.

BACKGROUND OF THE INVENTION

Facilities producing electrical power or steam conventionally burn hydrocarbons, e.g., oil, gas, or coal, in a process that produces substantial emission of $CO_2$ greenhouse gases, particulates, and hazardous air pollutants (HAP's). Electrical power plant emissions are practically unavoidable in a conventional burner/boiler system, and control of these materials requires multiple, expensive, post-combustion treatment systems that capture fly ash, $SO_x$, $NO_x$ and trace metals. Economical methods for capturing and sequestering the $CO_2$ do not exist, and accordingly such power plants contribute significantly to greenhouse gases. More currently available methods for combustion treatment of gases either reduce the fuel efficiency of the power plant, e.g., by preventing complete combustion, or significantly add to the operating cost of the system, or both.

Further, economic methods for capturing and sequestering the $CO_2$ do not exist, and accordingly such power plants contribute significantly to the concentration of greenhouse gases in the atmosphere.

In conventional boilers, the rapidly expanding combustion gas is discharged from the hot zone. In coal burning systems, for example, exit velocities are sufficient to pneumatically convey fine particles out of the combustion zone, including ash with unburned carbon. As much as 2% of the input fuel value can be lost in this manner. Conventional systems also operate with high temperatures to promote complete combustion of the fuel in a relatively short period of time if the fuel is in the combustion zone, which is typically milliseconds to seconds in length. Higher combustion temperatures promote higher levels of $NO_x$ and $SO_2$ and accelerate degradation of the burner zone. Most fuel-burning systems transfer heat or combustion to a working fluid, such as water or steam, which then drives a turbine.

Not all heat is extracted from the combustion gas, however. The temperature and pressure of the gas exiting the exchanger must be sufficiently high to both drive the exhaust gas up the stack and to assure that the temperature within the stack is above the dewpoint. Water vapor is a combustion by-product and condensation of that vapor within the exhaust system is deleterious. Accordingly, the exhaust gas stream transfers substantial heat from the power plant to the atmosphere; as much as 5% to 15% of the incoming fuel value is lost to the atmosphere in this manner.

Partly to counteract this phenomenon, conventional systems operate at high temperatures to promote more complete combustion of the fuel in the relatively short period of time that the fuel is in the combustion zone, typically milliseconds to seconds in length. An undesirable consequence of this adjustment is higher levels of $NO_x$ and $SO_x$ in the gas stream, which in turn accelerates degradation of the metal structures in the burner zone and forces installation of stack scrubbers to reduce the $NO_x$ and $SO_x$ concentration in gases discharged to the atmosphere.

Multiple systems are available for post-combustion treatment of gas streams to remove $NO_x$ and $SO_x$ by circulating the exhaust gas through solid or liquid reactants. These systems consume more energy than they generate, effectively derating the power plant. The chemical reactants employed provide no significant function beyond capture of $NO_x$ and $SO_x$ and their cost serves to reduce plant profit margins.

Systems for the economic removal of other pollutants from conventional fuel combustion processes, such as mercury, radionuclides and other metals, are practically not available. Almost all solid and liquid hydrocarbon fuels contain trace amounts of mercury and radioactive elements. Industrial by-products that are combusted in waste-to-energy systems also contain metals, including in some cases precious metals. While metal concentration in the exhaust gas stream is low and daily emissions minimal, over time these pollutants accumulate to potentially harmful concentrations in downwind soil and bodies of water. In the case of precious metals, current combustion systems cannot be configured for their economic recovery.

In the case of mercury and other high vapor pressure metals, capturing these pollutant from the gas phase requires a substantial expense for cooling to condense or adsorb the metal on a suitable collection device. The cooling system would be an energy drain, further derating the plant. While a cooling process might recover waste heat, this approach is not considered economically viable.

While condensation might effect removal of mercury, radioactive particles can only be removed by physical separation, e.g. filtration, or by chemical reaction. Due to the large volume of gas and water vapor produced by combustion and the low concentration of radioactive particles, these approaches are not economically viable. As a result, the radioactive material is left to accumulate downwind from a conventional power plant.

Of all of the emissions from power plants, the one of greatest current concern and research is carbon dioxide. Numerous activities are underway worldwide to sequester emitted $CO_2$ in an effort to reduce its concentration in the atmosphere.

Several proposed methods separate $CO_2$ from the exhaust gas and inject it into stable geologic or marine environments, physically isolating it from the atmosphere. The stability and duration of that separation is not well understood, and over time this stored gas will likely migrate to the atmosphere. A beneficial use of this method is injection for enhanced oil recovery (EOR), where the $CO_2$ both increases formation pressure and lowers the viscosity of the oil. In both geologic and marine applications, substantial energy is expended to separate the $CO_2$ and then pump it to the depths required.

Other proposed methods use the separated $CO_2$ as a reactant in a variety of post-combustion chemical synthesis reactions. For instance, the $CO_2$ can be bubbled through aqueous solutions or slurries containing metal oxides or metal ions. By adjusting reactant concentration and the mixture's temperature, a solid mineral particle may be precipitated. These precipitates may be collected and dried, then disposed or used as an input to another product. These systems largely depend on endothermic reactions, requiring that power be diverted from the plant. Biological methods are also proposed, utilizing both the ecosystem (ocean waters, if proximate to the power plant) and controlled environments (e.g., bioreactors). Again, there is an energy cost for separation and pumping, plus the additional capital and operating expenses for complementary nutrients and chemistry.

All of these systems share the common disadvantages of attempting to separate and utilize $CO_2$ in post-combustion devices. Post-combustion processing increases the cost and complexity of building and operating a power plant, as well as reduces the net energy output of the plant.

Some proposed systems, such as the Integrated Pollutant Removal (IPR) system co-developed by DOE Albany Research Center and Jupiter Oxygen Corp., separate oxygen from air prior to combustion, then feed oxygen only into the combustion chamber. The resulting exhaust gas stream is largely CO2, minimizing or eliminating the requirement for post-combustion gas separation. Further development of the IPR system is directed to filtering and compressing the exhaust gas to remove particulates, recover additional energy that might otherwise be discharged through the stack and condition the CO2 for commercial uses or geologic injection. Gas compression, however, is a substantial additional energy and capital cost for this system.

U.S. Pat. No. 6,372,156 discloses a method of chemically converting raw material to another material utilizing a hybrid plasma system. The system utilizes a plasma including activated hydrogen and oxygen formed from a water vapor. U.S. Pat. No. 5,125,965 discloses a process for enhancing fluidization in a fluidized bed reaction chamber. In a preferred embodiment, the molybdenum oxide is reduced to a molybdenum metal. U.S. Pat. No. 4,368,169 discloses a pyrochemical process for the decomposition of water. The process is carried out in a reaction chamber of a reactor during and immediately after a thermonuclear reaction. The initial chamber reaction yields a condensed metal oxide product which is split in a later process to yield oxygen and a condensed metal product.

The disadvantages of the prior art are overcome by the present invention, and the included system is hereinafter disclosed for combusting carbon-containing fuel to minimize pollution from fuel combustion.

SUMMARY OF THE INVENTION

In one embodiment, the system for combusting a carbon-containing fuel comprises a reactor for supporting simultaneous oxidation of the carbon-containing fuel and conversion of produced $CO_2$ to a mineralized $CO_2$ product. A metal oxide or metal is input into the reactor along with the fuel to be combusted. The $CO_2$ byproduct of the oxidation is intimately mixed with the metal or metal oxide inputs and is converted to a mineralized $CO_2$ product within the reactor.

According to one embodiment of a method according to the invention, a carbon-containing fuel is combusted within a reactor for supporting simultaneous oxidation of the fuel and conversion of $CO_2$ to a mineralized $CO_2$ product. A selected metal oxide or metal is input into the reactor along with the fuel to be combusted. Condensable gases from the reactor are condensed in a cold trap and the condensate returned to the reactor. A desired vacuum or pressure within the reactor is maintained with a vacuum pump.

These and further features and advantages of the present invention will become apparent from the following detailed description, wherein reference is made to the figures in the accompanying drawings.

DETAILED DESCRIPTION OF PREFERRED EMBODIMENTS

Figure 1:
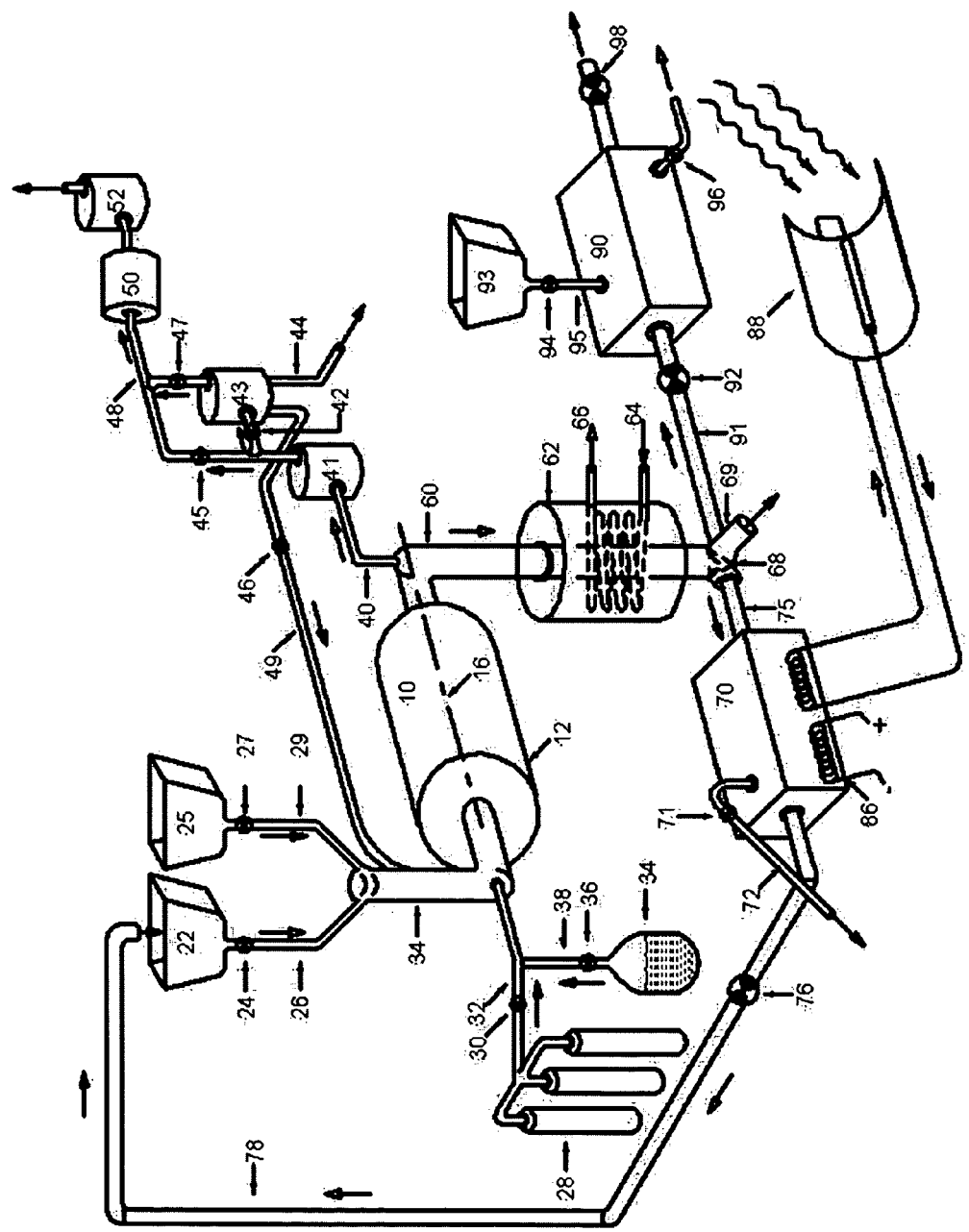
FIG. 1 is a flow diagram of a suitable system for combusting a fuel.

The system of the present invention may be used to combust a carbon-containing fuel in a reactor which supports the simultaneous oxidation of the fuel and conversion of $CO_2$ to a mineral powder or other mineralized $CO_2$ product. The reactor produces energy, as the primary reactions are exothermic, and benefits from a significant reduction in capital and operating costs compared to combustion systems utilizing current technology to simultaneously produce energy and reduce emissions.

As shown in FIG. 1, the reactor 10 may be a fluid bed reactor which may reach its initial desired reactor temperature as a result of the input of conventional fuel and oxygen. As shown in FIG. 1, the bed of the reactor is a horizontal cylinder 12 with a chamber therein, with the cylinder mounted to rotate about a substantially horizontal axis 16 of the reactor. One end of the reactor chamber may provide for the continuous or intermediate loading of the fuel or a fuel blend, the reactive gas and the reactive solid, while the opposite end of a reactor may have a mechanism for controllably discharging reaction products. The temperature within reactor 10 is normally maintained between about 500° C. and less than about 1000° C. The reactor 10 may have a reaction chamber within the reactor of from 200 liters to 200,000 liters.

It should be appreciated that the reaction process and the conversion of CO2 as discussed herein may occur in either a batch process or a continuous process. Those skilled in the art will appreciate that, for many applications, significant advantages are obtained by utilizing the methods discussed herein in a continuous process. The diameter of cylinder 12, the rotational speed of the cylinder 12, and the fill level within the cylinder chamber are configured to fluidize the input material. The discharge reaction products from the reactor may be carbonate, silicate, alumino-silicate, and other materials which may be sold in that form, processed for reuse in the combustion system, or processed to recover captured metals.

The operation may be initiated by commencing rotation, loading the cylinder, and igniting the mixture at a predetermined load level. Once ignited, the reaction is preferably self-sustaining as long as a fuel blend and reactive gases and solids are fed into the cylinder. Exothermic reactions occur in sequence. In the first, carbon and oxygen combine to form $CO_2$, a byproduct of the oxidation. In the second, $CO_2$ combines with a mineral-forming element or compound, e.g., Ca, CaO or other metal oxide, to form a mineralized $CO_2$ product or compound. In one application, the $CO_2$ reacts with the metal oxide CaO to produce calcium carbonate. Other carbonate-forming materials may be used, such as MgO or NaO. The $CO_2$ produced in the first reaction is mostly or totally consumed in the second reaction, so that minimal exit gas is exhausted from the reactor. The system is also essentially "flameless," and the reaction products are solid with the substantially higher heat-carrying capacity than gas. Accordingly, heat can be transferred to a working fluid such as steam through a smaller, more efficient exchanger.

The reactor of the present invention promotes complete combustion at relatively low operating temperatures, reducing production of $SO_x$ and $NO_x$. In a conventional system, sulfur compounds would be released and accelerate degradation of components in the burner zone, heat exchanger and exhaust system. In the present invention, if either sulfur or nitrogen are present, components of the fuel or fuel blend will preferentially react with the sulfur and/or the nitrogen.

FIG. 1 illustrates a metal powder or metal oxide powder feeder 22 with a control valve 24 along flow line 26 for regulating the flow rate of this reactant to the reactor 10. A fuel feeder 25 with a control valve 27 along a flow line 29 regulates the flow of fuel to the reactor 10. Process gases from storage devices 28 or from the atmosphere may flow through control valve 30 and line 32 to regulate the flow of process gases to the reactor 10, and optionally a CVD bubbler 34 may add vapor phase reactants to the reactor by flowing past control valve 36 in line 38. An atomizer or a direct liquid injection system may be used instead of a bubbler to control the reaction process and the produced byproducts of the reaction, including the facilitation of the capture of selected materials and thus the reduction of pollutants. The reaction will also consume atmospheric $CO_2$ that is a component of the ambient air supplied as the feed gas. Accordingly, the system disclosed herein not only reduces $CO_2$ emissions, but also reduces ambient $CO_2$ levels. The mixture is ignited and the subsequent reactions selectively extract $CO_2$ to form mineralized solids. Depending on the nature of the reactants, gases and vaporized liquids may also be produced.

Solids, gases and vaporized liquids produced in reactor 10 are preferably discharged to separator 60, which feeds the mineralized $CO_2$ solids to heat exchanger 62 and the gases and vaporized liquids to line 40.

If atmospheric air is utilized, nitrogen will pass through the combustion process largely unreacted. The volume and velocity of this exhaust gas stream are both substantially reduced, in comparison to a conventional system which would also include reaction products such as $CO_2$ and water vapor. This exhaust gas may flow via line 40 to a dry filter 41, which removes particulates, and then to a vapor condensation and liquids separation unit 43 via control valve 42. If the condensate has significant energy value, it may be returned to reactor 10 through control valve 46 and line 49. If the energy value of the condensate is too low for combustion, or if the condensate contains hazardous substances, such as mercury, it may be discharged to a suitable transportation container or process through line 44, instead of being discharged to the atmosphere.

Gas which passes by the condensation/separation unit 43 flows via control valve 47 and line 48 to gas pump 50, which maintains the desired gas pressure/vacuum and flow rate in both the reactor and the condensation/separation unit. Although the pressure/vacuum will vary with applications, in most cases the vacuum in the reactor is controlled to be at a level of about 100 to 760 torr, and the vacuum in a condensation unit 43 is controlled to be from about 50 to 600 torr. Gases discharged by the gas pump are passed to a conventional scrubber 52 and then passed to atmosphere.

Solids discharged to heat exchanger 62 heat a working fluid that enters the exchanger inlet 64 and exits exchanger outlet 66. The working fluid thus transfers the energy to a device, such as an electric power generator or heater. Cooled solids are discharged from exchanger 62 to diverter valve 68, which directs solids to a discharge port 69 or to a regenerator 70.

The oxygen required for combustion within the reactor 10 can be supplied either in a mixture (as from the atmosphere) or in elemental form (as $O_2$). Inputs may be initially heated to their reaction temperature and the heat released by the reaction sustains combustion as additional reactants are fed to the chamber. The reaction of the $CO_2$ and metal oxide or metal is also exothermic, adding energy to the output of the plant.

Since the product of the reaction is a solid, there is significantly less gas discharged from the combustion zone, with corresponding decreases in the transfer of fuel particles, heat and pollutants to the atmosphere. The solid reaction product has a substantially higher heat capacity than gas, which reduces the size and cost of the plant's heat exchanger system. Solids can be more easily retained than gas for extended periods, increasing the total heat recovery of the system. Further, when sulfur is present in the fuel, the produced solid is less chemically reactive than the gas produced in a conventional combustion system. As a result, more conventional metals for construction of the reactor may be used.

The produced solid is effective for capturing and chemically fixing the trace pollutants contained in fuel, such as sulfur, chromium, mercury and radionuclides. Alternatively, selected elements or compounds may be introduced to the combustion chamber specifically for the purpose of reacting with these pollutants and fixing them in the solid product. For instance, a conventional bubbler may be used to produce vaporized reactants for delivery to the chamber through a control valve and feed line.

Some HAPs may not participate in these reactions or adsorb onto the surface of the mineral produced by combustion. However, since the volume and thermal energy of the gas output is significantly reduced by the removal of $CO_2$ from the exhaust, filtration, cooling or other technologies may be more easily and economically applied.

In the case of waste-to-energy processing, recoverable amounts of commodity or precious metals may be present. These metals may either participate in the reaction, forming a mineral product, or may remain in their elemental form adsorbed to or mixed with the mineral powder. In either case, the mineral powder can be processed to recover a high metal content residue.

In one embodiment, mineral powder produced in the reactor passes through diverter valve 68 to line 91. Valve 92 controllably delivers the mineral powder to reactor 90. A liquid solution prepared in feeder 93 is controllably delivered to reactor 90 through valve 94 and flow line 95, for the purpose of selectively dissolving the mineral powder according to the conditions described below. Reactor 90 may optionally include pumps and heaters (not shown) for controlling the temperature and pressure within the reactor.

If the recoverable metal is adsorbed onto the surface of or blended with the mineral powder, the composition and pH of the solution and the thermal and pressure conditions of the reactor are controlled to selectively dissolve the mineral powder and preserve the solid nature of the adsorbed or blended metals. These solids then fall to the bottom of the reactor, where they are controllably discharged through valve 96 for further processing and refinement.

If the recoverable metal is mineralized in the combustion process, the composition and pH of the solution and the thermal and pressure conditions of the reactor are controlled to dissolve the mineral powder and then selectively precipitate the recoverable metal in solid form. These solids then fall to the bottom of the reactor where they are controllably discharged through valve 96 for further processing and refinement. The residue of mineral powders treated in reactor 90 are the recoverable metal stream controllably discharged through valve 96, which the spent solution is discharged through valve 98.

Those skilled in the art will appreciate that alternative separation methods exist that may produce, for instance, a separable liquid stream containing the recoverable metal, as opposed to the solid separation discussed above.

The produced mineral may be processed with solar energy at minimal cost, converting it to a metal or metal oxide. This conversion dissociates $CO_2$ from the mineral and produces a reactant with suitable energy content for reuse in the combustion reaction, as noted below. The dissociated $CO_2$ is of sufficient quality for use in a variety of chemical, industrial and consumer applications. In this manner, the produced mineral solid is a combined separation and storage system for $CO_2$, facilitating the extraction of $CO_2$ from the combustion process and production of high grade $CO_2$, by the addition of solar energy.

The produced mineral may also have unique features compared to other forms that are either mined or manufactured from precipitation processes. Mineral particles produced by this combustion method exhibit smaller sizes than mined and crushed materials. Smaller size, and the resulting larger surface area, are beneficial in applications such as reinforced plastics, coatings and paper manufacture. Similar size particles can be achieved by precipitation methods, but the manufacturing cost is lower for those produced by this combustion method.

A fluid bed reactor is well suited for the system of the invention, since it allows a relatively high temperature to be controlled within the reactor, and reactive gases input to the reactor may also be controlled to regulate the environment of the materials within the reactor. While the system has been described for use with a fluid bed reactor, other types of reactors may be utilized which allow gases to come into contact with a high surface area of the material.

As noted above, the system selectively extracts $CO_2$ from the gases produced by oxidation of the carbon-containing fuel. With the addition of regenerator chamber 70, which serves as a second reactor, the $CO_2$ can be reversibly extracted from the mineral product by the addition of thermal energy. Sufficient thermal energy is available from solar reflectors or concentrators, which can readily heat the mineral powder to temperatures of 900° C. or greater. Alternatively, waste heat from other processes may be used in chamber 70. Line 75 serves as a conveyor to transfer mineralized $CO_2$ product to the second reactor 70, which produces a $CO_2$ outer stream along line 72 and a metal oxide or metal powder output stream along line 78. Line 78 thus serves as a conveyor to transport the metal oxide or solid metal product from the reactor 70 to the reactor 10.

The extracted $CO_2$ gas stream may be discharged from the reactor 70 through control valve 71 and line 72. The remaining metal oxide or metal powder may be discharged through control valve 76 and line 78 to hopper 22, where it is used as a reactant within reactor 10. In this manner, the energy input provided to regenerator 70 is stored in the metal oxide or metal powder and then released in reactor 10 to increase its energy output. If the energy source for regenerator 70 is solar, this converts a conventional combustion power plant to a combined combustion-solar plant.

The resulting metal oxide or metal powder may be controllably conveyed back to reactor 10, where it is used as a reactant. In this manner, energy from the heater 86 is chemically stored in the metal oxide or metal powder and then released in reactor 10 to increase its energy output. If heater 86 is solar powered, this converts a conventional combustion power plant to a combined combustion-solar plant.

The foregoing disclosure and description of the invention is illustrative and explanatory of preferred embodiments. It would be appreciated by those skilled in the art that various changes in the size, shape of materials, as well in the details of the illustrated construction or combination of features discussed herein maybe made without departing from the spirit of the invention, which is defined by the following claims.

What is claimed is:

1. A system for combusting a carbon-containing fuel, comprising:
    a reactor for supporting simultaneous oxidation of the fuel and conversion of $CO_2$ therein;
    a metal oxide or metal for inputting to the reactor to convert the $CO_2$ to a mineralized $CO_2$ solid product;
    an exchanger downstream from the reactor for transferring heat from the mineralized $CO_2$ solid product;
    a separation unit for capturing condensable vapors in exhaust gas from the reactor; and
    a gas pump for maintaining a desired pressure within the reactor.

2. A system as defined in claim 1, further comprising:
    a conveyor for controllably transporting the mineralized $CO_2$ product from the reactor to another reactor to produce a $CO_2$ gas output stream and a solid metal or metal oxide product output stream; and
    another conveyor for transporting the solid metal or metal oxide product from the another reactor to the reactor.

3. A system as defined in claim 2, wherein thermal energy is input to the another reactor.

4. A system as defined in claim 1, wherein the exchanger transfers heat from the mineralized $CO_2$ product to a working fluid for producing energy.

5. A system as defined in claim 1, wherein the separation unit returns condensates to at least one of the reactor and a storage container.

6. A system as defined in claim 1, wherein the gas maintains a desired pressure within the separation unit.

7. A system as defined in claim 1, further comprising:
    a fuel input for inputting the fuel to the reactor; and
    a reaction gas line for inputting selected reaction gases to the reactor.

8. A system as defined in claim 7, wherein the fuel and the reaction gases input to the reactor generate a reaction temperature within the reactor of at least about 500°C. and less than about 1,000°C.

9. A system as defined in claim 1, further comprising:
    a scrubber for treating gases discharged from the separation unit.

10. A system as defined in claim 1, wherein reaction of the $CO_2$ and the metal oxide or metal produces a metal carbonate.

11. A system as defined in claim 1, further comprising:
    one of a bubbler, an atomizer, and a liquid injection system for adding vapor-phase reactants to the reactor.

12. A system as defined in claim 1, further comprising:
    a dry filter for removing particulates from the exhaust gas prior to exhaust gas entering the separation unit.

13. A system as defined in claim 1, wherein the reactor has a reaction chamber volume of from 200 to 200,000 liters.

14. A system as defined in claim 1, wherein the reactor is a fluid bed reactor that rotates about a substantially horizontal reactor axis.

15. A system as defined in claim 1, further comprising:
    another reactor for dissolving solid products of combustion from the reactor to recover metals contained in the solid products by one of separation and precipitation.

16. A method of generating heat from a fuel, comprising:
    supporting simultaneous oxidation of the fuel and conversion of $CO_2$ in a reaction chamber of a reactor;
    inputting a metal oxide or a metal to the reactor to convert the $CO_2$ to a solid metal carbonate product;
    capturing exhaust gas from the reactor; and
    maintaining a desired pressure within the reactor.

17. A method as defined in claim 16, further comprising:
    inputting a reaction gas or vapor to the reactor; and
    generating power from the heat generated in the reactor.

18. A method as defined in claim 16, wherein the fuel and the reaction gases input to the reactor generate a reaction temperature of at least about 500° C. and less than about 1,000°C.

19. A method as defined in claim 16, wherein the captured exhaust gases are converted to a condensate, and the condensate is returned to the reactor.

20. A method as defined in claim 16, wherein the reactor is a fluid bed reactor that rotates about a substantially horizontal reactor axis.

21. A method as defined in claim 16, wherein metals contained in the fuel are captured elements or compounds adsorbed to or mixed with metal carbonate product.

22. A method as defined in claim 21, wherein captured metals are recovered by dissolution of the mineral products and physical separation or precipitation of the metal elements.

23. A method as defined in claim 16, further comprising:
transferring heat from the metal carbonate product to the reaction chamber of the reactor.

24. A system for combusting a carbon-containing fuel, comprising:
a reactor for supporting simultaneous oxidation of the fuel and conversion of $CO_2$ therein;
a metal oxide or metal for inputting to the reactor to convert the $CO_2$ to a mineralized $CO_2$ solid product;
an exchanger downstream from the reactor for transferring heat from the mineralized $CO_2$ solid product; and
one of a bubbler, an atomizer, and a liquid injection system for adding vaporizing-phase reactants to the reactor.

25. A system as defined in claim 24, further comprising:
a dry filter for removing particulates from the exhaust gas prior to exhaust gas entering a separation unit.

26. A system as defined in claim 24, wherein the reactor has a reaction chamber volume of from 200 to 200,000 liters.

27. A system as defined in claim 24, wherein the reactor is a fluid bed reactor that rotates about a substantially horizontal reactor axis.

28. A system as defined in claim 24, further comprising
another reactor for dissolving solid products of combustion from the reactor to recover metals contained in the solid products by one of separation and precipitation.

29. A system as defined in claim 24, further comprising:
a conveyor for controllably transporting the mineralized $CO_2$ product from the reactor to another reactor to produce a $CO_2$ gas output stream and a solid metal or metal oxide product output stream; and
another conveyor for transporting the solid metal or metal oxide product from the another reactor to the reactor.

* * * * *